United States Patent [19]

Jorgensen et al.

[11] Patent Number: 4,527,595
[45] Date of Patent: Jul. 9, 1985

[54] FLOW REGULATOR

[75] Inventors: Peter Jorgensen, Havnbjerg; Jens J. Molbaek, Lavensby; Volker Spies, Augustenborg; Poul C. Dyhr-Mikkelsen, Høruphav; Poul S. Dam, Ketting, all of Denmark

[73] Assignee: Danfoss A/S, Nordborg, Denmark

[21] Appl. No.: 500,555

[22] Filed: Jun. 2, 1983

[30] Foreign Application Priority Data

Jun. 22, 1982 [DE] Fed. Rep. of Germany ....... 3223206

[51] Int. Cl.³ ............................................. F15D 1/02
[52] U.S. Cl. ........................................ 138/43; 138/46
[58] Field of Search ........................... 138/42, 43, 46; 137/504, 625.28, 625.3, 625.37

[56] References Cited

U.S. PATENT DOCUMENTS

| 1,668,681 | 5/1928 | Kirlin | 138/46 X |
| 2,762,397 | 9/1956 | Miller | 138/43 |
| 3,470,915 | 10/1969 | Bitzer et al. | 138/43 |
| 4,196,753 | 4/1980 | Hammarstedt | 138/43 |

FOREIGN PATENT DOCUMENTS 2018113 10/1979 United Kingdom ................ 239/542

Primary Examiner—James E. Bryant, III
Attorney, Agent, or Firm—Wayne B. Easton

[57] ABSTRACT

The invention relates to a flow regulator in which a diaphragm of elastically deformable material is disposed between a pressure chamber at supply pressure and an end face of a base member having open radially extending grooves. A supply passage extends from the regulator inlet circumferentially around the diaphragm into fluid communication with the grooves and a discharge passage is axially disposed in the base member in fluid communication with the radially inward ends of the grooves. Pressure variations in the supply passage cause the diaphragm to cover varying lengths of the grooves to vary the throttling effects of the grooves. The regulator is adapted for different ranges of flow quantities by providing two or more grooves in the face of the base member and by providing valving apparatus for selectively connecting one or more of the grooves to the supply passage.

15 Claims, 8 Drawing Figures

FLOW REGULATOR

The invention relates to a flow regulator in which a disc of elastically deformable material is disposed between a pressure chamber at supply pressure and an end face of a base member that has an open radial groove, a supply passage which extends from the regulator inlet communicating with the radial groove on the outside and a central discharge passage on the inside.

In a known flow regulator of this kind (DE-OS 24 25 069), the housing has a cylindrical depression, at the planar base of which there is a radial groove of rectangular cross-section communicating at the outside with a supply passage in the form of an axial groove which is disposed at the inner circumference of the cylindrical bore and is permanently connected to the regulator inlet. At the base of the bore, there also lies a rubber disc which is covered by a metallic disc. The portion of the bore thereabove forms a pressure chamber at supply pressure. As the pressure increases, the material of the rubber disc is pressed into the radial groove so that its flow section decreases. Consequently, the flow quantity is held substantially constant independently of the supply pressure.

Such a flow regulator is designed for a particular flow quantity. Since, in practice, regulators are required for different flow quantities, it is necesary to produce a corresponding multiplicity of regulator sizes and keep them in stock. During installation, the mechanic must either know beforehand which flow quantity is the correct one at the particular position and place an appropriate order or he must bring with him a number of flow regulators of various sizes.

It is the problem of the invention to provide a flow regulator of the aforementioned kind with which the amount of flow is still selectable at the place of use.

This problem is solved according to the invention by at least two radial grooves each having a supply passage and by valve apparatus for selectively connecting at least one supply passage to the regulator inlet.

In this construction, the elastically deformable disc acts on two or more radial grooves. Since these grooves are made selectively operative by the valve apparatus, several flowquantities can be set. If the radial grooves have equal cross-sections, the different flow quantity is obtained by the number of radial grooves which are made operative. If the radial grooves have different cross-sections, which is preferred, one can instead or in addition set the flow quantity by selecting different radial grooves.

It is advisable for the cross-sections of the radial grooves to be dimensioned so that the flow quantities defined thereby have the relationship $Q_o, 2Q_o, 2^2Q_o \ldots 2^nQ_o$. This enables flow quantities to be set in equal steps.

In a constructionally advantageous embodiment, the radial grooves extend from a conical surface. The higher the supply pressure, the larger is the radial length of the radial groove which is covered by the elastically deformable disc. The throttling resistance therefore increases by elongating the throttle passage.

The radial grooves can advantageously have a cross-section which decreases inwardly. With increasing supply pressure, therefore, not only is the length of the throttle passage increased but is cross-sectional dimension is also reduced. These features enable the throttling resistance to be regulated so accurately that the flow quantity remains constant fairly accurately within a large pressure range.

It is very favourable if the disc is a diaphragm. Such a diaphragm has greater mobility than a thicker rubber disc and is therefore more adapted to influence the throttling passages which are provided with the aid of the radial grooves.

The diaphragm may be clamped at the margin. It is, however, advisable for it to rest loosely at the periphery. It will then not be hindered by its outer clamping during its independent deformation.

In a preferred embodiment, to form a rotary slide valve apparatus, the base member is rotatable in a housing and, along a slide face, fixed control orifices connected to the regulator inlet selectively co-operate with rotatable control orifices connected to the supply passages. Simple rotation of the base member therefore enables different flow quantities to be set.

It is in this case advisable for the slide face to extend along an end wall of the housing that is at right-angles to the rotary axis and for the base member to be pressed against this end wall by a spring. This results in a particularly simple construction.

Another possibility is for the slide face to extend along the outer periphery of the base member. In particular, the periphery may be slightly conical and the base member pressed by a spring in the direction in which the cone converges. This results in good sealing with a comparatively large slide area.

For adjustment, the base member may have a formation on its free end face for applying a rotary tool and carry a marking for setting purposes, the housing having a corresponding recess. This results in a very simple possibility for positively setting the desired flow quantity.

Another possibility is that the base member is provided at the periphery with formations for applying a tool and the housing is provided at the same height with a slot which extends over part of the periphery and is sealed from the interior. By inserting the tool, it is possible to adjust the base member through angles corresponding to the length of the slot.

With particular advantage, the configuration (number, position and/or circumferential length) of the fixed control orifices differs from that of the rotary control orifices so that several combinations of supply passages can be connected to the regulator inlet. By reason of the different configuration of the control orifices, simple rotary movement enables one to obtain the desired different connections of the supply passages.

In a preferred embodiment, all the control orifices are disposed on a circular track, the rotary control orifices are offset from each other by 90°, and the fixed control orifices are disposed in all four quadrants of the circular track such that, when a rotary control orifice sweeps over a quadrant, it assumes at least the following positions: it is in communication with the fixed control orifices on its own, in combination with a second rotary control orifice, in combination with the second and a third rotary control orifice and in combination with the three other rotary control orifices. Since these four positions are repeated for a different first rotary control orifice after each 90° of rotation, all conceivable variations can be set with four control orifices.

In a different embodiment, the fixed control orifices are disposed on different coaxial circular tracks and their length as well as their spacing in degrees from circle to circle is in the ratio of 1:2. This permits the individual radial grooves of different cross-section to be operated in the manner of a binary code.

In particular, the circular tracks may lie in one plane and the rotary control orifices can be associated from inside to outside with radial grooves of increasing cross-section. In this way, one obtains a comparatively small rotary slide surface because a radial groove of smaller cross-section can also be associated with a smaller control orifice.

It is very advantageous for such a flow regulator to be employed as a flow limiter in a hot water central heating installation. Hitherto, presettable valves have been used for this purpose which are set to a fixed K value after a very cumbersome and expensive pressure distribution computation. By employing the flow regulator, such pressure loss calculations become superfluous and the inevitable inaccuracies of such calculations are eliminated. The flow regulator need merely be set to the flow quantity desired at a particular position. Everything else follows automatically. One type of flow regulator suffices for use in installations of different pressures and, within any one installation, for different flow quantities.

The invention will now be described in more detail with reference to preferred examples illustrated in the drawing, wherein.

Figure 1:
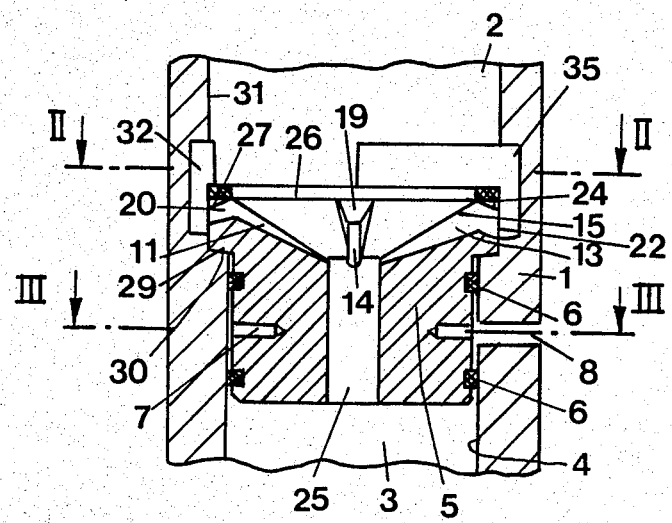
FIG. 1 is a longitudinal section through a flow regulator according to the invention.

The flow regulator of FIGS. 1 to 4 comprises a housing 1 with a diagrammatically indicated regulator inlet 2 and regulator outlet 3. This inlet and outlet can in the usual way be provided with connecting means or screwthreads.

A body 5 (base member) carrying two sealing rings 6 at its periphery is disposed in a cylindrical bore 4 of housing 1. Between the sealing rings there are four formations 7 in the form of bores disposed in the same plane as a slot 8 which extends through 90° in the housing 1. By means of this slot, a rod-like tool can be introduced in a formation 7 so that the body 5 can be turned. The rod at the same time forms the pointer which can co-operate with a marking 10 in slot 8.

The body 5 comprises four radial grooves 11, 12, 13 and 14 which extend from a conical surface 15 and have a cross-section which decreases inwardly from the outside. The radial groove 11 has the smallest cross-section, the radial groove 12 a somewhat larger cross-section, the radial groove 13 a still larger cross-section and the radial groove 14 the largest cross-section. Each radial groove is connected to a supply passage 16, 17, 18 and 19, respectively, which extends from a control orifice or groove valve means 20, 21, 22 or 23 in the peripheral face 24. A central discharge passage 25 is common to all radial grooves. A diaphragm 26 which has a thickened portion 27 at the margin rests freely on the margin 28 of the end face of the body 5.

The supply pressure in the regulator inlet 2 presses the thickened portion 27 against the margin 28 and a shoulder 29 of body 5 against a step 30 of housing 1.

Four fixed control orifices or stationery valve means 32, 33, 34 and 35 provided in the peripheral wall 31 of housing 1 are disposed on the same circular track and co-operate with the control orifices or groove valve means 20 to 23. The four control orifices 32 to 35 cover all four quadrants of the circular track and have approximately the following lengths and angular spacings, each quadrant being sub-divided into five sections of 18° each: control orifice 32 = 54°—spacing 36°—control orifice 33 = 36°—spacing 18°—control orifice 34 = 18°—spacing 18°—control orifice 35 = 100°—spacing 72°. The rotatable control orifices 20 to 23 are offset from each other by 90°. Their circumferential extent in degrees is a maximum of 18°.

Figure 2:
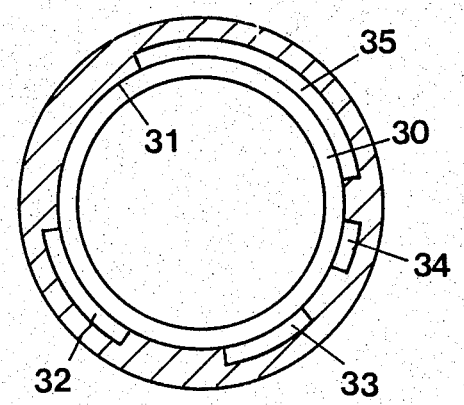
FIG. 2 is a section on the line II—II in FIG. 1.
Figure 4:
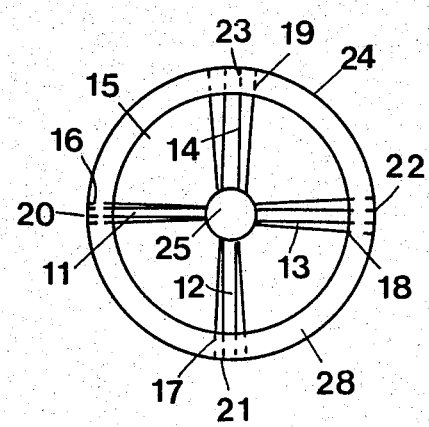
FIG. 4 is a plan view of the FIG. 1 base member.
Figure 3:
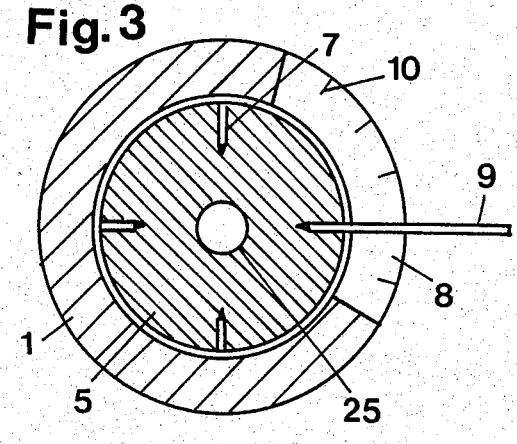
FIG. 3 is a section on the line III—III in FIG. 1.

In the illustrated position of FIGS. 2 and 4, only radial groove 14 is connected to the regulator inlet 2 by way of the control orifices 23 and 35. All the other radial grooves are inoperative. On the existence of supply pressure, diaphragm 26 is deflected downwardly and, depending on the pressure, covers a certain length of radial groove 14. Consequently, with increasing pressure the length of the throttling passage increases, the smallest cross-section of this throttling passage decreases and thus the throttling resistance increase as a whole so that the flow quantity remains substantially constant. By turning the body 5 through 18° at a time, radial grooves 11 to 14 can be made operative either alone or in combination with one or more of the other radial grooves.

In the illustrated example, radial groove 11 is designed for a flow quantity of 10 l, radial groove 12 for 20 l, radial groove 13 for 40 l, and radial groove 14 for a flow quantity of 80 l. The flow quantities Q therefore have the relationship $1:2:2^2$ etc. Accordingly, by turning the body 5 it is possible to set desired flow quantities between 10 and 150 l in steps of 10 l.

Figure 5:
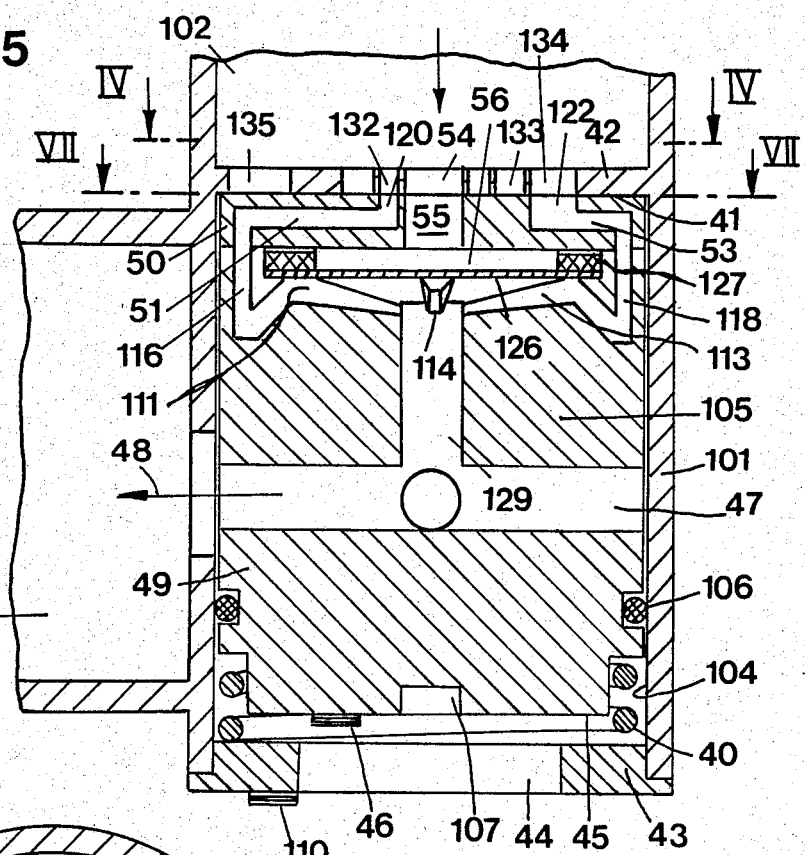
FIG. 5 is a longitudinal section through a modified embodiment.
Figure 6:
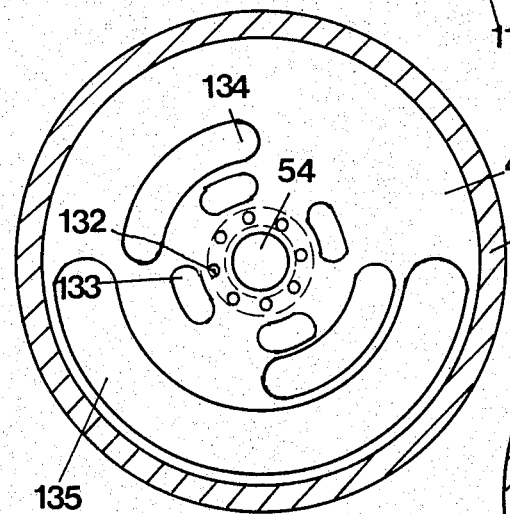
FIG. 6 is a section on the line VI—VI in FIG. 1.
Figure 7:
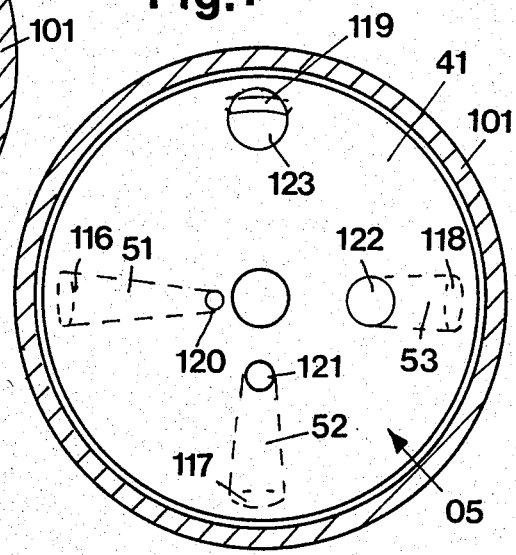
FIG. 7 is a section on the line VII—VII in FIG. 1.

In the embodiment of FIGS. 5 to 7, corresponding parts use the same reference numerals increased by 100. A first difference is that the body 105 (base member) has its end face 41 pressed against an end wall 42 of housing 101 by a spring 40. The spring is supported on a cover 43 which has an aperture 44 through which a tool can engage in a formation 107 in the end face 45 of body 105. At this end face 45 there is also a marking 46 for setting purposes which, with the marking 110 at the cover 43, enables the rotary position of body 105 to be read. The central discharge passage 129 is connected by way of radial passages 47 to an aperture 48 in the housing 1 that leads to the regulator outlet 103.

The body consists of two interconnected parts 49 and 50 between which the diaphragm 126 is held with its thickened margin 127. The rotary control orifices 120 to 123 are disposed in the end face 41 of body 105 and have different radial spacings from the rotary axis. For this reason, the control orifices 120, 121 and 122 are connected to the associated supply passage 116, 117 and 118 by way of a respective radial passage 51, 52 and 53, whereas the control orifice 123 communicates directly with this supply passage 119.

Stationary control orifices 132, 133, 134 and 135 are provided on four different circular tracks in the end wall 42 of housing 1. In addition, there is a central hole 54 which leads to the pressure chamber 56 above the diaphragm 126 by way of a bore 55 in the part 50. The control orifices 132 on the innermost circle each extend over somewhat less than 22.5° and have a spacing of the same order. The control orifices 133 have an angular length of almost 45° and are spaced apart by the same amount. The control orifices 134 cover somewhat less than 90° and have the same spacing. The control orifice 135 extends over almost 180°. The radial widths of these control orifices increase from the inside towards the outside and the same is true for the diameters of the rotary control orifices 120 to 123.

If it is again assumed that the radial grooves have been designed in the same manner as in the first example, it is again possible to set every desirable flow quantity from 10 l up to 150 l with differences of 10 l.

Figure 8:
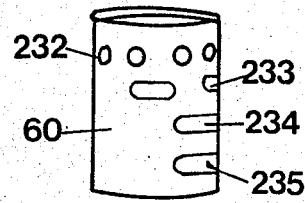
FIG. 8 shows the housing insert of a further embodiment.

The arrangement of the control orifices 132 to 135 in the last-mentioned example can also be employed for a circumferentially extending rotary slide face, as is shown in FIG. 8. In this case, a housing insert 60 has first fixed control orifices 232 in an upper row, control orifices 233 in a second row, control orifices 234 in a third row and control orifices 235 in a fourth row. These control orifices are subjected to the supply pressure from the outside. The supply passages in the rotary body are so arranged that the appropriate rotary control orifices open at different heights corresponding to the four elevations of control orifices 232 to 235.

In the embodiment of FIGS. 1 to 4 as well as that of FIG. 8, the slide faces may be slightly conical to produce a good seal in the region of the control orifices. In addition, a spring may be provided to push the body in the direction in which the cone converges.

Upon installation in a hot water central heating plant, the flow regulator can be placed in the supply or return line of a radiator or of a branch or even of the entire plant.

We claim:

1. A flow regulator, comprising, a housing having a fluid inlet section and a fluid outlet section, a generally cylindrically shaped valve body rotatably disposed in said housing between said sections, said valve body having a recessed end face adjacent said inlet section, grooves in said end face of different sizes to provide different flow quantity characteristics and including at least one radially extending groove, said valve body having a central discharge passage communicating with said housing fluid outlet section, fixed control orifices associated with said housing fluid inlet section, groove valve means associated with said grooves and being variably cooperable with said fixed control orifices for different adjusted positions of said valve body for selectively connecting certain ones of said grooves, a disk with an elastically deformable center section and a rigid rim, said disk rim being in engagement with the periphery of said recessed end face, said disk center section being deformable by pressure in said housing fluid inlet section to progressively cover said grooves to increase the throttle resistance thereof.

2. A flow regulator according to claim 1 wherein said grooves includes at least two of said radially extending grooves having different cross sections.

3. A flow regulator according to claim 2 wherein said grooves are dimensioned binarially relative to the flow quantity characteristics thereof.

4. A flow regulator according to claim 1 wherein said valve body recessed end face is conically shaped.

5. A flow regulator according to claim 3 wherein said radially extending grooves have cross sections which decrease inwardly towards the center of said recessed end face.

6. A flow regulator according to claim 1 wherein said disk is a diaphragm.

7. A flow regulator according to claim 6 wherein said diaphragm rests loosely at said rim thereof.

8. A flow regulator according to claim 1 wherein the downstream side of said housing fluid inlet section is bounded by transversely extending wall means, and spring means for biasing said valve body into abuting engagement with said wall means.

9. A flow regulator according to claim 1 wherein said valve body has a formation on the end thereof opposite said end face thereof for receiving a setting tool for rotating said valve body and carries a marking for setting purposes.

10. A flow regulator according to claim 1 wherein said valve body has formations at the periphery thereof between the ends thereof for receiving a setting tool for rotating said valve body, and a slot in said housing for providing access to said formations.

11. A flow regulator according to claim 1 wherein said fixed control orifices have a number of constituent elements that differ in number from the constituent elements of said groove valve means so that several complementary selections may be made.

12. A flow regulator according to claim 1 wherein said groove valve means comprise rotary control orifices, all of said orifices being on a circular track with said rotary control orifices being offset from each other by 90° and said fixed control orifices being disposed in all four quadrants of said circular track, at least one of said rotary control orifices having optional positions in combination with only one of said fixed orifices or with more than one of said fixed orifices.

13. A flow regulator according to claim 8 wherein said groove valve means comprise rotary control orifices, all of said orifices being on circular track means with said rotary control orifices being offset from each other by 90° and said fixed control orifices being disposed in all four quadrants of said circular track, at least one of said rotary control orifices having positions in combination with only one of said fixed orifices or with more than one of said fixed orifices.

14. A flow regulator according to claim 13 wherein said fixed control orifices are disposed on different coaxial circular tracks in said transversely extending wall means and their lengths and their spacings in degrees from circle to circle is in the ratio of 2:1.

15. A flow regulator according to claim 14 wherein said circular tracks lie in one plane and said rotary control orifices are associated from inside to outside with radial grooves of increasing cross section.

* * * * *